May 17, 1966  R. B. LE ROY ET AL  3,251,170
METHOD OF PRODUCING A SHIPPING CONTAINER
Original Filed Feb. 15, 1962  4 Sheets-Sheet 1
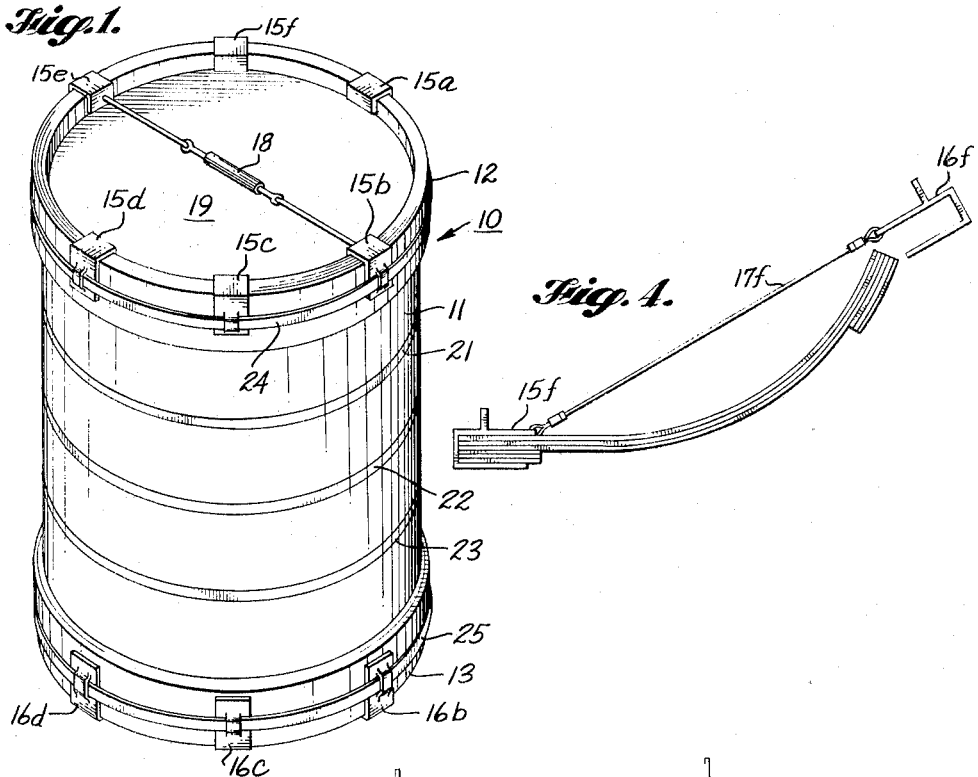
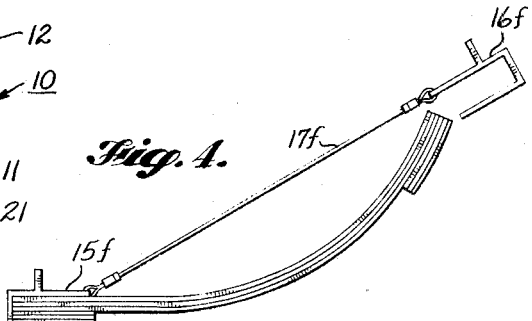
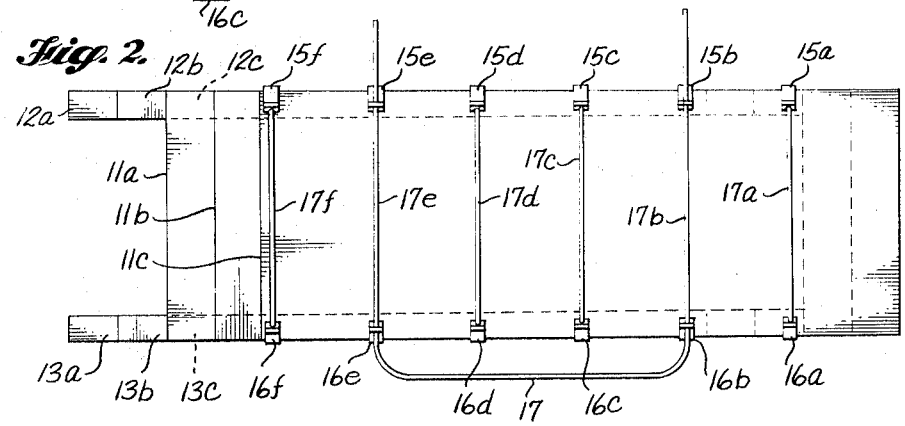
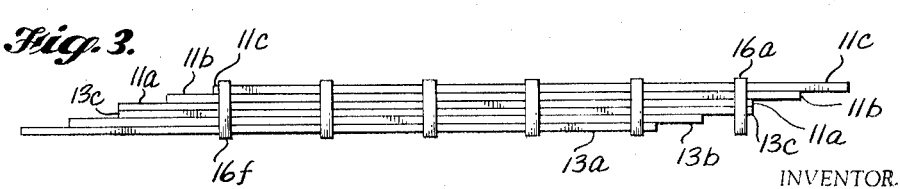
INVENTOR.
ROBERT B. LeROY
ROBERT B. POOL
BY
ATTORNEYS

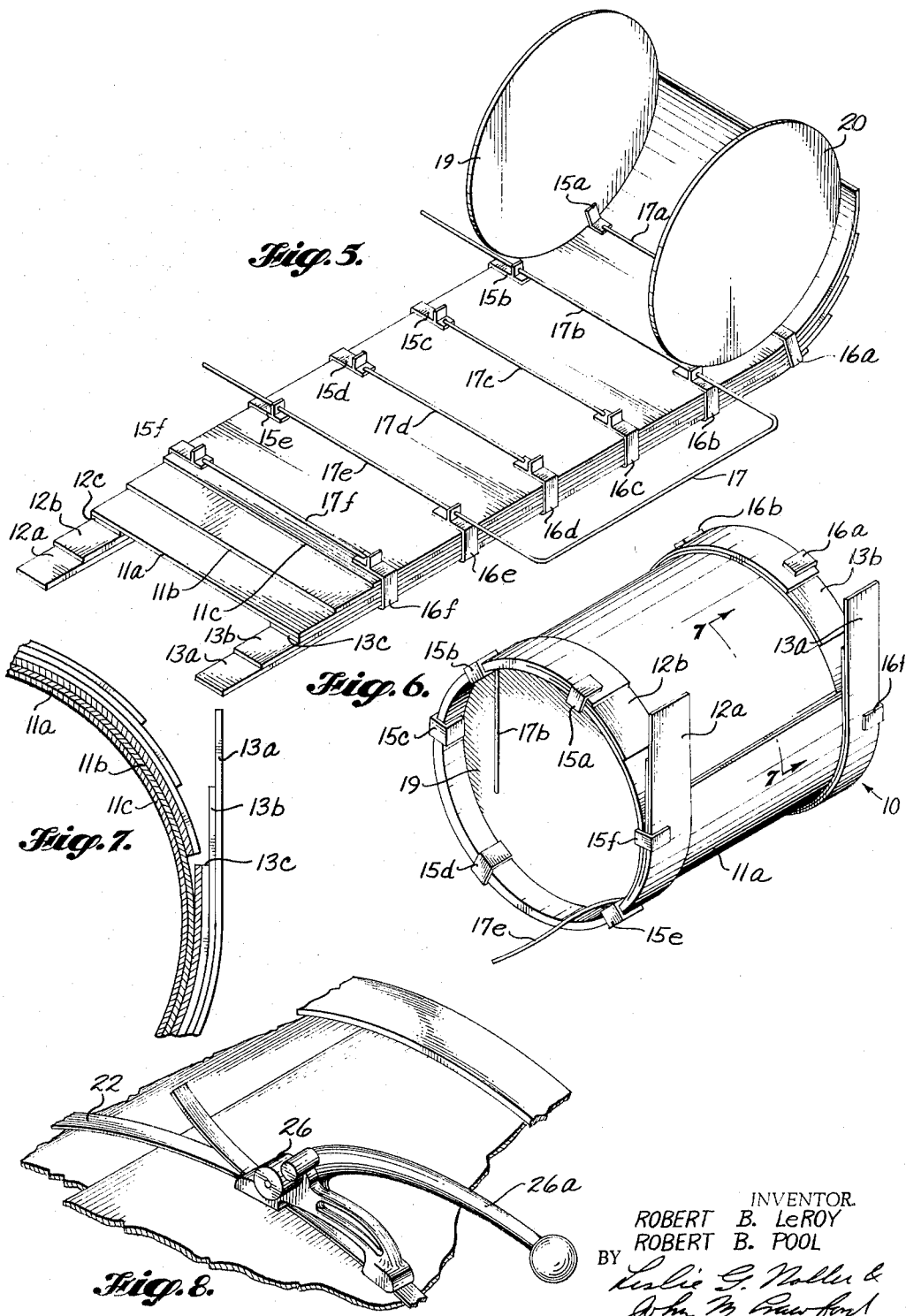

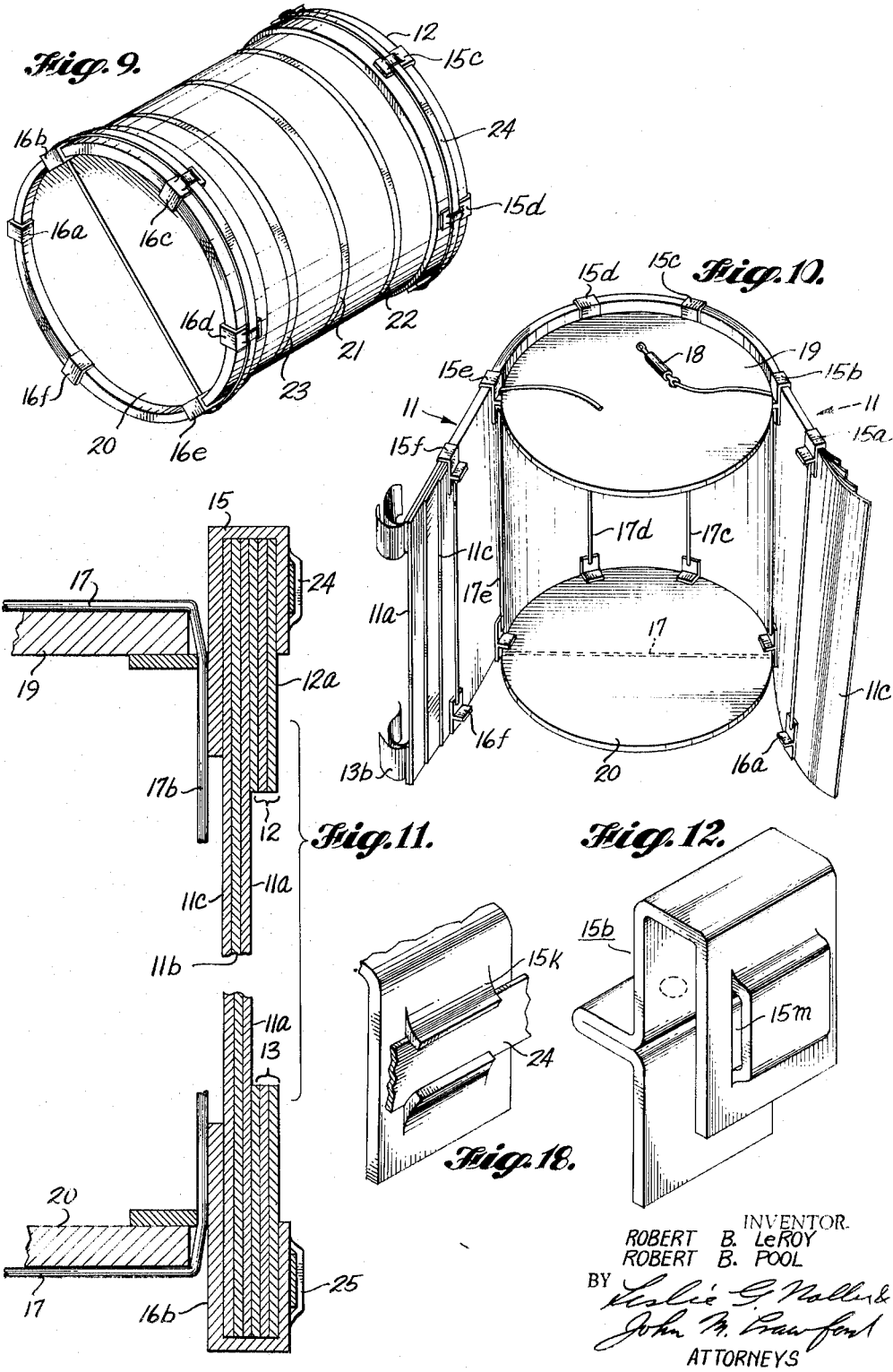

May 17, 1966  R. B. LE ROY ET AL  3,251,170
METHOD OF PRODUCING A SHIPPING CONTAINER
Original Filed Feb. 15, 1962  4 Sheets-Sheet 4
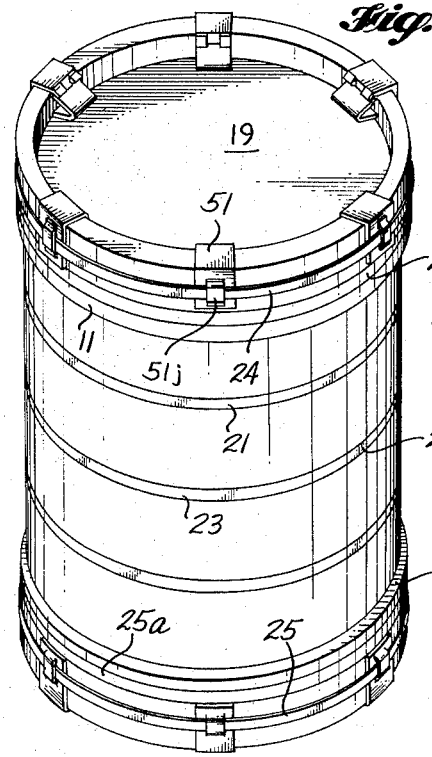
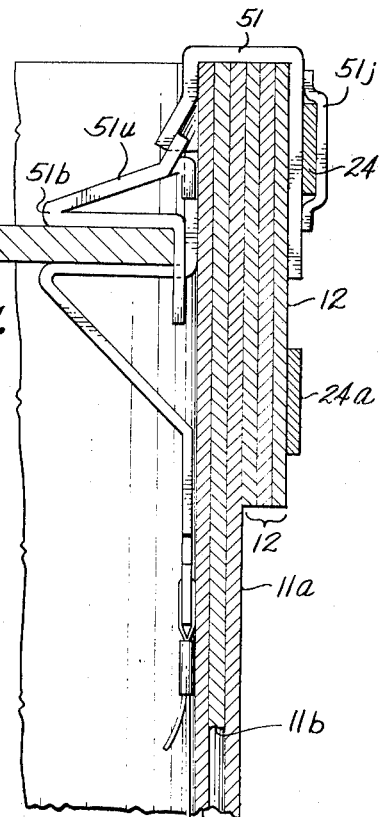
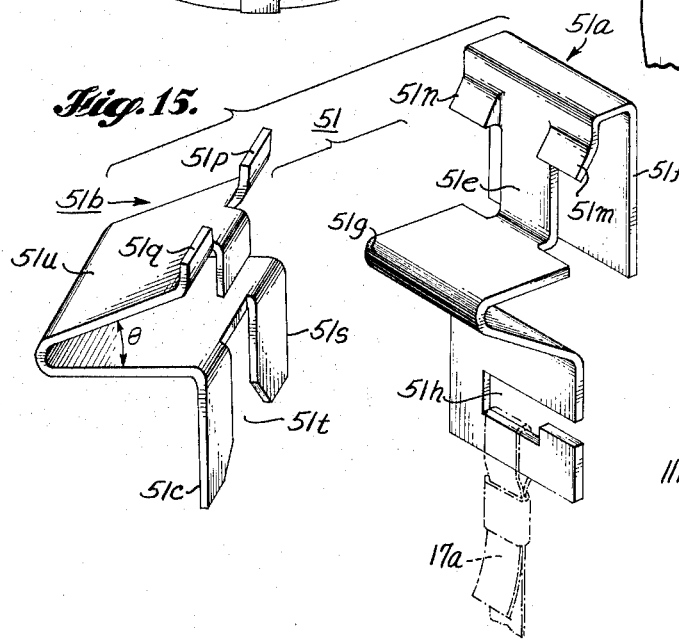
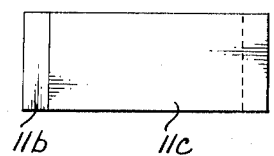
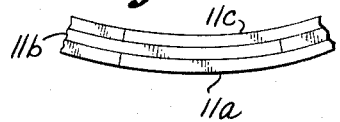
INVENTOR.
ROBERT B. LeROY
ROBERT B. POOL
BY
ATTORNEYS

United States Patent Office 3,251,170
Patented May 17, 1966

3,251,170
METHOD OF PRODUCING A SHIPPING CONTAINER
Robert B. Le Roy, Kenilworth, Ill., and Robert B. Pool, Willingboro, N.J., assignors to Weyerhaeuser Company, Tacoma, Wash., a corporation of Washington
Original application Feb. 15, 1962, Ser. No. 173,438, now Patent No. 3,186,619, dated June 1, 1965. Divided and this application Sept. 23, 1964, Ser. No. 398,544
5 Claims. (Cl. 53—29)

The present application is a division of application Serial No. 173,438, filed February 15, 1962, now Patent No. 3,186,619, dated June 1, 1965.

This invention relates to shipping containers adapted to many uses, and particularly of the hogshead type, and has for an object the provision of a shipping container which may be shipped and stored in collapsed or flat condition and quickly and economically erected at the site of use.

Though the principles of the present invention are applicable to shipping containers of many kinds and sizes, some of the advantages will be made quickly apparent by considering the requirements of containers generally referred to as hogsheads and measuring some four feet in diameter and four feet high. Hogsheads as used in the tobacco industry impose the requirement of adequate strength to withstand heavy loading as well as the resilient or expanding character of the compressed tobacco. Such containers should have walls easily removed for ready inspection of the contents by tobacco buyers and adapted to reassembly for shipping purposes.

In order to meet the foregoing rigid requirements of hogsheads as used in the tobacco industry, preassembly of the hogsheads has been required. Thus whether shipped loaded or empty the same amount of shipping space has been required. Moreover the preassembly operations and the nature of the hardware attached to the walls and closures have made uneconomic or impossible printing of the walls by presses to take advantage of valuable advertising space on display during shipment.

Equally stringent requirements are imposed upon many other types of containers, though of less, as well as, greater size than those characterizing the hogshead. They, too, have not been well adapted to use of printed advertising copy on the exterior walls.

It is an object of the present invention to utilize readily available materials of relatively low cost, flexible in character for shipment while flat, and to combine with them a suspension system which at the point of use not only brings the container material into proper configuration, but provides, independent of that material, structural elements resisting the loading of the container and the shocks incident to shipment of a loaded container.

It is a further object of the invention to assemble hogsheads and other containers from one or more plies of fibreboard, none of which are adhesively secured together, and all of which after assembly with the ends overlapping are held together by circumferential and lengthwise tension members which together with attaching clips and end-closure members provide a container with a strength corresponding with that of both the resulting suspension system and the fibreboard material itself.

It is a further object of the invention to utilize fibreboard and other materials of flexible character which are shipped flat and absent any precutting, and absent any hardware of any kind, whereby the fibreboard or other material may be prefinished together with complete printing of designs, labels and other advertising material ready to be presented on the exterior surface of the container.

In carrying out the invention in one form thereof, containers in the form of hogsheads may be shipped flat and quickly erected as needed. Each container comprises a suspension system, a plurality of plies of fibreboard of approximately equal length and two end closure members. The containers are assembled with the end of each ply overlapping the adjacent end by some 12 inches. Though these plies may be shipped with the overlapping feature provided at the point of shipment, that feature is preferably provided at the point of use. Thus at the point of use, the plies are placed in said overlapping relationship. The plies are rolled about round end closure members thereby forming the plies into a cylindrical shape with the end portions of the several plies in overlapping relationship. Steel strapping, as currently in use in reinforcing packages, may be applied at several points lengthwise of the cylinder to hold the plies in position and to form a part of the load-bearing suspension system. The container assembly preferably includes at its end portions circumferential reinforcements in the form of a plurality of narrow plies of fibreboard, each of which may extend lengthwise of the container some 6 inches to 8 inches, though they may be of different width. These plies with their end portions in overlapping relation, as above described, will be held in place by additional circumferential tension members. There are also utilized a plurality of supporting members or clips at opposite ends of the container, each having U-shaped portions embracing wall structure of all plies. Each portion of each of the clips or supporting members external to the container is provided with an opening through which another circumferential tension member may extend, one at each end of the container, to hold them in place, and to form another part of the suspension system. A plurality of lengthwise tension members, such as steel strapping, are disposed in interconnecting relationship on the inside of the container, one for each opposing pair of supporting members or clips at the ends of the container.

The invention is characterized by the fact that the suspension system formed by the internal tension members together with the external tension members provides adequate reinforcement for the multiple plies of fibreboard, itself a relatively strong material and for heavy bulging types of loads. Thus, with closure members secured to the supporting clips or members at the opposite ends of the container, material under compression, such as tobacco, fully filling the container, may be shipped from one point to another, and at the same time the containers may be readily opened for access to the contents, as from both ends and sides, as is essential in the tobacco industry.

For further objects and advantages of the invention and for examples of modifications thereof, reference is to be had to the following description taken in conjunction with the accompanying drawings, in which:

FIGURE 1 is an isometric view of a container embodying one form of the present invention;

FIGURE 2 is a plan view of an assembly of plies, clips and internal tension members in positions preparatory to producing a container;

FIGURE 3 is a side view of FIGURE 2;

FIGURE 4 is an end view of FIGURES 2 and 3 illustrating how certain of the inner tension members and clips may be applied to the fibreboard assembly;

FIGURE 5 is an isometric view illustrating the manner in which the assembly of FIGURE 3 is rolled into a cylindrical shape about the circular closure members;

FIGURE 6 is an isometric view of the cylindrical hogshead as the rolling opeartion is completed;

FIGURE 7 is a fractional sectional view of FIGURE 6 taken on the line 7—7 showing how the plies move into overlapping engagement at the completion of the rolling operation;

FIGURE 8 is a fractional isometric view illustrating the application to the hogshead of an exterior tension member and the fastening together of the ends of the tension member;

FIGURE 9 is an isometric view of the hogshead after application thereto of the tension members;

FIGURE 10 is an isometric view of the hogshead with the exterior tension members severed and the walls opened away from the contents (not shown) and one end closure in position for removal;

FIGURE 11 is a sectional view of a hogshead utilizing a clip structure of modified form two of which appear in FIGURES 1–3 and 5;

FIGURE 12 is an isometric view of the modified clip structure of FIGURE 11;

FIGURE 13 is an isometric view of another preferred form of the invention;

FIGURE 14 is a sectional view of the hogshead of FIGURE 13 taken in the region adjacent one of the clip structures;

FIGURE 15 is an isometric view of one of the clip structures of FIGURES 13 and 14;

FIGURE 16 illustrates a modified form of the invention and particularly how the plies may be disposed to form a tongue-and-groove arrangement, and FIGURE 17 is a side view of the tongue-and-groove joint formed by the ararngement of FIGURE 16.

FIGURE 18 is a view of a portion of a clip showing a modification of the clip.

Referring now to FIGURE 1, the invention in one form has been shown as embodied in a container 10, the body wall 11 of which is formed of a plurality of plies of fibreboard. At the respective ends of hogshead 10 are a plurality of reinforcing plies respectively forming wide reinforcing bands 12 and 13 circumferentially of the opposite ends of the container 10. The plies forming the reinforcing bands 12 and 13 and the plies forming the body wall 11 are embraced by a plurality of clips of U-shape. There have been shown six clips 15a–15f at one end of the hogshead disposed in alignment lengthwise of the container 10 with the six clips 16a–16f at the opposite end. As best shown in FIGURE 2, a tension member 17 in the form of a steel cable or strap extends through openings in clips 15b, 16b, 16e and 15e, the portions 17b and 17e extending along the inner wall of the container 10 acting as longitudinal tension members. The free ends of the tension member 17, FIGURE 1, are interconected by a turnbuckle 18. In this manner the end closure members 19 and 20, FIGURES 1 and 9, are held in place within the wall structure at each end of the hogshead and against flanges or shelf structure of each clip. The turnbuckle 18 and the tension member 17 form a part of the suspension system. This suspension system, including the six U-shaped clips 15a–15f at the top of the container and the six clips 16a–16f at the bottom of the container respectively interconnected by tension members 17a–17f, provides resistance to all outwardly directed forces by keeping the end closures 19 and 20 firmly in place. The clips mechanically hold the plies together and the tension members hold the clips in place.

The interconnection of each pair of clips by the longitudinally extending tension members 17a–17f provides resistive outwardly directed forces by reason of mechanical interconnection of the clips and the closure members 19 and 20. Thus, metal screws may extend through each closure member and into threaded engagement with each of the flanges or shelf-projections of said clips. The structure of each clip is best seen in FIGURE 12. Instead of screws, any suitable locking or fastening may be used.

As a further part of the suspension system there are provided a plurality of circumferential reinforcing elements three of which, the elements 21, 22 and 23, encircle the body wall 11. These elements may be formed of steel or metal straps. Metal strapping of the metal banding type used for packages will be suitable. In addition to the three body straps 21–23, there are provided further straps 24 and 25 respectively passing through slots in the clips and so mechanically interconnecting all of the U-shaped clips at the respective ends of the container. Each of the straps 24 and 25 has its ends secured together with the strap under a moderate amount of tension. Thus, the clips at the respective ends of the container press the plies of the reinforcing bands 12 and 13 tightly together and against the body wall 11 to provide added strength and reinforcement of the end portions of the container 10.

The manner in which the container 10 of FIGURE 1 may be assembled at the site of use and the several advantages of the suspension system comprising the internal and external tension members will be better understood in conjunction with the description of the assembly operations which will now be set forth.

At the point of use, the three reinforcing plies 12a, 12b, and 12c, FIGURES 2–5, will be laid one on top of the other and in staggered relationship to provide overlapping at the ends. Thus the left-hand end of the reinforcing ply 12b will be disposed about twelve inches from the left-hand end of the reinforcing ply 12a and the end of ply 12c about twelve inches from the end of ply 12b. The companion reinforcing plies 13a–13c for the opposite end of the container will be similarly stacked, one on top of the other, in a position to form the band 13.

The several body plies 11a, 11b and 11c (shipped flat) are laid over the reinforcing plies and one on top of the other in stepped relationship.

Though other than the described staggered arrangement can be utilized, as will be later explained, it is to be noted that in FIGURES 3–5, the body ply 11a has its left-hand edge in alignment with the left-hand edges of the reinforcing plies 12c and 13c. With the plies thus assembled, there will then be applied the U-shaped clips 15a–15f these being disposed along the upper edge portions of the plies as viewed in FIGURE 2. The clips 16a–16f will be similarly placed in position on the lower edge of the stacked arrangement of plies. Since the tension elements 17a, 17c, 17d and 17f interconnect opposing pairs of clips as illustrated in FIGURE 2, needed slack to permit the U-shaped clips to embrace the stacked plies can be attained by bending the plies longitudinally as shown in FIGURE 4 for the clips 15f and 16f. More particularly, the clips along one edge-portion of the plies will be first slipped onto them with the tension elements lying crosswise of them. By then stepping midway of the plies, the other side portion can be lifted. The resultant arcuate bending of the plies shortens the straight-line distance between their sides. The clips can be slipped into place in the manner illustrated for the clip 16f. Of course, the clips may be applied by sliding them along the stacked arrangement of plies but the foregoing method has been found to be an expeditious one. Each opposing pair of U-shaped clips may be applied and the tension members then secured to them by a strapping tool 26 shown in FIGURE 8. The end result in each case is the application of the clips to the stacked array of plies as illustrated in FIGURE 2. The manner of applying tension element 17 has already been described.

With the foregoing steps completed, the assembly is now ready to be shaped into a container in manner illustrated in FIGURE 5.

Tension members of the two types comprising member 17 and additional members 17c, 17d and 17f have been illustrated for the reason that tension members of different types can be utilized for a container or all tension members may be of like character. Thus, all tension members may be like number 17 and additional turnbuckles used to tighten said members in the same way as turnbuckle 18 in FIGURE 1. Such interconnected tension members will cross each other diametrically of the bottom closure member 20 and as a final operation the turnbuckles tightened over the closure member 19. On the other hand, the cable or strap 17, best shown in FIGURE 5, may be replaced by tension members interconnecting the opposing clips and as illustrated by the portions 17b and 17e of member 17.

In assembling the container, the two end closure members 19 and 20 are located at the opposite side-portions of the stack of plies and corresponding end portions of the plies are guided upwardly around the closure members which then act as forms for rolling the body plies 11a–11c and reinforcing plies 12a–12c and 13a–13c into a cylinder.

The flanges or shoulder portions of each clip provide increasing stability for the plies as the rolling operation progresses and as the container assumes its final shape, shown in FIGURES 1, 6 and 9.

As best shown in FIGURE 7, in the region where the body plies 11a–11c meet and overlap, the body wall thickness of the container 10 will comprise three body plies and none of their meeting edges will be in alignment with the meeting edges of the remaining plies. This staggered arrangement provides additional strength and minimizes the possibility of leakage of any of the contents from the container. Though the ends of plies 11a, 11b and 11c in FIGURE 7 have been shown as in abutting relationship, there will be a slight space between the opposite ends of ply 11b, and a slight space between the opposite ends of the outer ply 11a when the plies are of the same length. This spacing will arise because of the greater distance around the container for ply 11b than for ply 11c due to the thickness of the ply 11c. If abutting relationship of opposing ends be desired, the two plies 11b and 11a will each be of increasingly greater length than the ply 11c, to compensate for the change in diameter due to the thickness of each of the plies. In practice it has been found that the body plies 11a–11c may be of equal length and that the abutting relationship is not essential to meet most packaging requirements.

The same observations apply to the lengths of the reinforcing plies 12a–12c and 13a–13c. They can be of equal or differing length.

With the parts in the positions illustrated in FIGURE 6, it is of course possible to slide the clips 15a, 16a and 15f, 16f circumferentially of the container so that the U-shaped portions of the opposing pairs of clips will receive the overlapping portions of the plies and thus aid in holding the plies in their cylindrical configuration. However, these clips need not be moved. Instead, as the container is formed into the shape of FIGURE 6, there is applied circumferentially of the body portion the first of the circumferential tension members, the tension member 22. As already explained, that tension member may comprise a steel strap of the kind used generally in the packaging art and which may be readily applied, as shown in FIGURE 8 by a strap fastening tool 26 operable by the handle 26a. In similar manner, there will then be added the additional tension members 21 and 23 as shown in FIGURE 1. It is at this time that there will be added the tension members 24 and 25 of FIGURE 1. The straps forming these tension members are threaded through window-openings (see window opening 15m of clip 15b, FIGURE 12) formed by outwardly bent structure of each of the clips to form a mechanical connection therewith. The ends of each of the straps or tension members 24 and 25 are secured together under tension by means of the strap-fastening tool 26 of FIGURE 8.

The container will now appear as in FIGURE 9. Fastening elements will now be applied to hold bottom closure 20 against the clips 16c, 16d and 16f. These may be metal screws (not shown). The tension member 17 extends diametrically across closure 20 and aids in holding closure 20 in place. A plurality of criss-crossed tension members can serve this function without added fastening elements. The container 10 may now be set up on its bottom with the closure member 19 at the top removed for filling the container.

The expansion forces are absorbed and resisted by the suspension system formed by the several longitudinal tension members 17a–17f of FIGURE 2 all located interiorly of the hogshead and by the plurality of external circumferentially disposed tension members 21–25 of FIGURE 1. In this connection, after the container has been filled, the upper closure member 19 is pressed into place and the ends of tension member 17 secured to opposite ends of the turnbuckle 18. This turnbuckle is then operated until that tension member throughout its length has been pulled tight.

When the container comprises a hogshead as used in the tobacco industry, the tobacco is "prized," that is, the leaf tobacco is placed in the hogshead in layers and these layers pressed and forced together to a point where the tobacco comprises an expansive load having considerable resilience or elasticity. Thus the tobacco tends to press outwardly in all directions on the hogshead and thus the suspension system of the present invention is of particular importance for the hogshead application.

Another factor in the tobacco industry of importance in connection with the hogsheads is the practice of full and complete inspection of the tobacco at the time purchase. The container or hogshead of the present invention is particularly advantageous because of the ease with which it meets the inspection requirements. This is shown in FIGURE 10, by severing the circumferential tension members as by tin-snips or cutters, and by removing the fastening elements between closures and clips, the container wall 11 comprised of the several plies can be partly or wholly unwrapped from around the contents and the closures also removed. After the tobacco has been inspected in the plurality of places desired by a buyer, the plies can again be pulled together and the circumferential tension members applied as before. Thus it will be seen that there is much flexibility provided in accordance with the present invention both in the ease of forming the containers or hogsheads at the site of use and also by the ease in opening them either for ultimate use of the contents or for inspection prior to final delivery.

Referring to FIGURE 11 which is a sectional view taken on a line extending midway of the clips 15b and 16b of FIGURE 1, it will be seen that the reinforcing bands 12 and 13 of substantial width, provide increased thickness for the container in the regions of the clips 15b and 16b. Thus the clips of U-shape receive in nesting relationship the multiplicity of plies and these clips, interconnected by the tension member 17b, perform additional functions. Thus in moving the hogshead, lifting devices of the ice-tong type may be used. In any event, the lifting forces are applied to the reinforcing band 12 and these lifting forces are thus distributed by these bands to the several inner tension members and thence to the opposite closure member. The tension system provides the needed strength for the transfer operations of loaded containers. Normally the pointed ends of the arms of the lifting tongs may nest below the outer legs of an opposing pair of the U-shaped clips in avoidance of the possibility of tearing the outer ply 12a. In this connection the circumferential tension member 24 interconnecting the clips at the upper end of the container (and in like fashion the member 25 at the lower end) aids in increasing the strength of the assembly to withstand the lifting forces. As will later be explained, additional circumferential tension members may be applied to the reinforcing bands 12 and 13 in the regions spaced inwardly from the clips 15b and 16b of FIGURE 11.

Now that the principles of the invention have been explained, it will be understood that many modifications may be made. For example, in the preferred form of the invention as shown in FIGURES 13–15, the clips have been modified as to construction but the arrangement of producing the container in FIGURE 13 will be the same as described in connection with FIGURES 2–8 and the inspection features explained in FIGURE 10 are equally applicable. Referring now to FIGURES 14 and 15 the modified clip 51 comprises a body portion 51a having an upper U-shaped section formed by an inner-upstanding leg 51e connected by a cross member to a downwardly extending outer leg 51f. These two legs embrace the multiplicity of plies. The body member 51a has a horizontal shelf portion 51g on which may rest the closure member 19. The lower portion of the body member 51a terminates in a slot 51h open at one end. With preformed loops at the ends of the tension member 17a, the loop at one end will be inserted into the slot 51h as illustrated. In this connection, slots need not be provided since the end of tension member 17a may be threaded through an opening in the body member and then fastened to form the loop. The outer leg 51f of each clip has welded to it a U-shaped element 51j to provide an opening to receive the tension member 24. Instead of element 51j, the member 51f may have a pair of punched-out portions 51k which provide an opening to receive the tension member 24, as shown in FIGURE 18.

With the plurality of the body members or clips and tension members of the kind shown in FIGURE 15 applied to a container such as illustrated in FIGURE 13, the lower closure member 20 may be secured in place by a removable fastening element for each of the clips. The procedure will be the same as now described for the upper clip 51 of FIGURES 13 and 14. Thus the locking or fastening element 51b of FIGURE 15 is of V-shaped construction with the angle O between the upper and lower arms thereof selected so that when the V-shaped fastening element 51b is moved to the position illustrated in FIGURE 14, the angular portions occupy a somewhat greater space than that provided above closure member 19 which rests on the supporting shelf 51g. The downwardly and outwardly extending elements 51m and 51n of 51a then prevent outward or upward movement of elements 51p and 51q. The elements 51m and 51n are formed integrally with the body portion 51a and are arranged to receive along their back surfaces the upwardly extending elements 51p and 51q formed on the fastening element 51b. Downwardly extending legs 51c and 51s are disposed on opposite sides of a central opening 51t and thus straddle the narrow leg 51e of the body portion 51a. By applying a considerable pressure or force against the upwardly inclined portion 51u (FIGURE 14) of the fastening element 51b, it can be forced downwardly until the projections 51q and 51p may be moved behind the forward projections 51m and 51n and thereby snap into place. The metal has sufficient elasticity to permit this temporary deformation with return of the inclined portion 51u to its original position and in secure locking position as shown in FIGURE 14. With closure member 20 securely locked into place by a plurality of clips, the container will be ready to receive its load.

With the container filled, as by tobacco prized into it, adequate endwise pressure is then applied to the closure member 19 to compact the tobacco and to permit the lowering of the closure member onto the supporting shelves 51g. The fastening elements 51b, FIGURES 14–15, are driven into place by striking the upwardly inclined portion 51u of element 51b with a hammer. This action snaps locking elements 51p and 51q into place behind the forward projections 51m and 51n of body portion 51a, and the fastening element 51b is thus locked into position on body portion 51a. The hogshead may now be handled and transported in the usual manner.

The end closures 19 and 20 of the hogshead may be removed for inspection or unpacking after removal of fastening elements 51b. These elements may be removed by inserting a cold chisel between the upstanding leg portion 51e of body portion 51a and the fastening element 51b and striking the chisel with a hammer. The chisel wedges between body portion 51a and the element 51b and drives the inclined portion 51u downwardly and outwardly. This movement disengages locking elements 51p and 51q from projections 51m and 51n allowing fastening element 51b to be readily removed. Further inspection procedures are the same as those earlier described for FIGURE 10.

Notwithstanding the fact that the shipping container of the present invention is largely free of rivets, staples and adhesive, nevertheless, the container is water-resistant to a surprising degree and readily adapts itself to the reception of waterproof liners when they are deemed desirable. The absence of gluing, stapling and riveting becomes advantageous after the shipping container has served its purpose in transporting loads from one location to another. Thus by simple tools, as tinsnips, all metallic parts are readily separated from the fibreboard parts.

It is to be understood that in some cases it may be desirable to secure the plies one to the other. They can be stapled together, adhesively secured, frictionally held as described above, or retained by other known means.

While the invention is particularly adapted to shipping containers of the hogshead type, it will, of course, be understood that the containers may be made square or rectangular, the only requirement being the scoring of the body plies and of the reinforcing plies at the regions forming the corners of the shipping container and, of course, with appropriate change in configuration of the closure members.

Instead of having the plies in staggered relationship as in FIGURES 1–10, they may be assembled as in FIGURE 16 to provide the tongue-and-groove arrangement illustrated in FIGURE 17. Identical reference characters have been used for the plies of FIGURE 17 as in the other figures, since either the staggered relationship or the tongue-and-groove relationship will be a matter of choice in the assembly of the plies. Similarly, the width of the reinforcing bands may be varied as desired. In this connection, it will be noted that in FIGURE 1 the bands 12 and 13 are axially somewhat narrower than in FIGURE 13. In FIGURE 13, the reinforcing bands 11 and 13 are wider, and there have been added the two additional circumferential tension members 24a and 25a. Thus, each reinforcing band may have a plurality of circumferential tension members instead of the single one of FIGURE 1 and the pair for each band shown in FIGURE 13.

With the several modifications of the invention in mind as has been set forth above, it will be understood that further modifications may be made, all within the scope of the appended claims. For example, instead of straight edged lids, the lids may be beveled to provide a tighter fit. Material packaged within the container may sometimes be of a kind where leakage prevention is of primary importance. For these special applications leakproof liners will be utilized with the container and the plies themselves may be treated to be resistant to mildew, mold and inert to chemical attack.

While specific details of preferred embodiments have been set forth above, it will be apparent that many changes and modifications may be made therein without departing from the spirit of the invention. It will therefore be understood that what has been described herein is intended to be illustrative only, and is not intended to limit the scope of the invention.

What is claimed is:
1. The method of producing containers whose walls are formed by a plurality of plies of fibreboard comprising stacking said plies one on the other with the ends in offset relation with respect to the end portions of adjacent plies, applying clips interconnected by tension members to opposite edges of said plies at a plurality of spaced locations to hold them in alignment, placing the edges of closure members on the face of the uppermost ply, rolling said plies around said closure members of the container to bring the ends of each ply in juxtaposition with each other and the plies themselves into the contour of said closure members, applying a plurality of tightly fitting bands to, and circumferentially of, said plies at a plurality of locations to hold them in said contoured shape, and, after the loading of the container, interconnecting said closure members and said tension members to form with said bands a suspension system resistant to outwardly directed forces developed by said load.

2. The method of claim 1 in which said clips are provided with projections and in which said closure members are moved with said plies to engage in succession said projections.

3. The method of claim 1 in which said container after loading is opened by breaking said interconnections between said closure members and said tension members, cutting said bands, removing said closure members, and unrolling said plies with said clips and tension members in place.

4. The method of claim 3 in which after opening, said closure members are returned to container closing positions, said plies again rolled around them, said bands again applied and said interconnection between said closure members and said tension members re-established.

5. The method of producing a container with a wall including at least one flat bendable sheet comprising applying clips interconnected by tension members to opposite edges of said sheet at a plurality of spaced locations, placing the edges of closure members on the face of the uppermost ply, rolling said sheet around closure members for the container to bring the ends of said sheet into juxtaposition and to locate said tension members along the inner wall of said container, applying a plurality of tightly fitting bands to, and circumferentially of, said sheet at a plurality of locations to hold said sheet in the configuration of said closure members and to encircle said tension members, and, after the loading of the container, interconnecting said closure members and said tension members for transfer from said closure members to said tension members of outwardly directed forces developed from or by said load.

References Cited by the Examiner

UNITED STATES PATENTS 828,899   8/1906   Parker.
1,174,876   3/1916   Leiman _____ 93—39.1

FRANK E. BAILEY, *Primary Examiner.*

TRAVIS S. McGEHEE, *Examiner.*